United States Patent

Bade et al.

[11] Patent Number: 5,547,174
[45] Date of Patent: Aug. 20, 1996

[54] BEARING

[75] Inventors: Karl H. Bade, Mörlenbach; Walter Gruber, Weinheim; Anold Simuttis, Bad Kreuznach, all of Germany

[73] Assignee: Firma Carl Freudenberg, Weinheim, Germany

[21] Appl. No.: 78,130

[22] Filed: Jun. 16, 1993

[30] Foreign Application Priority Data

Aug. 25, 1992 [DE] Germany .................. 42 28 170.9

[51] Int. Cl.⁶ .................. F16C 27/06; B60K 17/24
[52] U.S. Cl. .................. 267/154; 267/281
[58] Field of Search .................. 267/279, 281, 267/282, 153, 154

[56] References Cited

U.S. PATENT DOCUMENTS

| 1,633,580 | 6/1927 | Froesch | 267/279 |
| 2,915,306 | 12/1959 | Hickman | 267/281 |
| 4,139,246 | 2/1979 | Mikoshiba et al. | 267/281 |
| 4,655,614 | 4/1987 | Schott | 267/293 |
| 4,744,677 | 5/1988 | Tanaka et al. | 267/154 |
| 5,209,461 | 5/1993 | Whightsil, Sr. | 267/154 |

FOREIGN PATENT DOCUMENTS 2061625  6/1972  France .

Primary Examiner—Matthew C. Graham
Attorney, Agent, or Firm—Kenyon & Kenyon

[57] ABSTRACT

A bearing comprising an inner support ring and an outer support ring surrounding and radially displaced from the inner support ring is disclosed. The support rings are supported on each other in a radially elastic manner by an intermediate ring made of at least three web elements made of rubber-elastic material, which are uniformly distributed over the circumference of the rings and which are fastened along holding surfaces to the support rings. The holding surface on the side facing the inner support ring is connected to the holding surface on the side of each web element facing the outer support ring by an imaginary line which intersects the central region of their circumferential extent and which forms with a radial plane intersecting the line an angle A of between 15°–75°.

18 Claims, 3 Drawing Sheets

BEARING

BACKGROUND OF THE INVENTION

The present invention relates generally to a bearing and, more particularly, to a bearing comprising an inner support ring and an outer support ring which surrounds the inner support ring at a radial distance, the support rings being supported on each other in a radially elastic manner by an intermediate ring of rubber-elastic material. The intermediate ring is formed by at least three web elements which are distributed over the circumference of the rings and are fastened on the support rings by holding surfaces.

This general type of bearing is shown in DE-AS 20 61 625. The bearing is used as an intermediate bearing for the drive shaft of a motor vehicle, the intermediate ring being formed by several web elements of rubber-elastic material which are uniformly distributed over the circumference. The web elements extend in radial direction between the inner and outer support rings, one stop buffer each being arranged between the web elements which are adjacent and spaced from each other in the circumferential direction. The stop buffer, which is attached to the outer support ring, extends in a radial direction and is associated in vibration-free condition with the inner support body adjacent thereto and at a radial distance therefrom. Unfortunately, the properties in use of this known bearing are quite unsatisfactory when viewed across an interval of time corresponding to a long service life. After the manufacturing process and during the intended use of the bearing, tensile stresses occur within the web elements which reduce their service life, and which can lead to an early failure of the bearing.

There remains a need for a bearing of the aforementioned type in which the tensile stresses within the intermediate ring of rubber-elastic material that may be created during its manufacture and which tend to reduce degrade service life are reliably avoided. There is a further need for such a bearing having improved properties in use during a longer service life, and in which the mechanical loads on the web elements are reduced.

SUMMARY OF THE INVENTION

The bearing of the invention comprises an inner support ring concentrically surrounded by an outer support ring. The support rings are supported on each other in a radially elastic manner by an intermediate ring made of rubber-elastic material. This intermediate ring is made up of at least three web-shaped elements that are uniformly distributed along the circumferential extent of each of the support rings, and which are attached thereto along holding surfaces. These holding surfaces are joined by the web elements.

Manufacture-induced tensile stresses within the intermediate ring of rubber-elastic material are avoided by configuring the holding surface on the side of the web facing the inner support ring so that it is connected to the holding surface on the side of the web element facing the outer support ring along an imaginary line that intersects the central area of the web element's circumferential extent at an angle of 15° to 75° with respect to a radial plane. This geometry reliably prevents the formation of manufacture-induced tensile stresses that adversely affect the service life of the rubber-elastic materials used. A manufacture-induced shrinkage of the web elements does not result, as it would in the case of web elements arranged in radial direction, in tensile stresses. Instead, there is merely a relative twisting of the inner support ring with respect to the outer support ring.

It is furthermore advantageous that due to the arrangement of the web elements between the inner and outer rings, a comparatively greater resilience can be realized. This results in a low-noise operation of the bearing.

Depending on the circumstances of the application in question, angles from 30° to 60° have proved advantageous. This development assures on the one hand sufficiently great resilience, which helps reduce operating noise, and on the other hand provides low mechanical bending loads on the holding surfaces of the web elements during the use of the bearing.

The web elements can be distributed uniformly over the circumference of the rings, there being advantageously provided at least three and preferably at least five web elements uniformly distributed over the circumference of the rings. If, for example, five web elements are used in a uniformly distributed arrangement along the circumference of the rings, the bearing can be installed in any desired position while maintaining consistently good properties in use.

To better enhance the service life of the bearing, the size of the web elements in the area of their holding surfaces may be increased in the circumferential direction. Additionally or alternatively, the web elements may be strengthened at least in part by the use of a reinforcement. A reinforcement is useful particularly in the area of the holding surfaces of the web elements due to the mechanical load occurring during their intended use.

The web elements can be of smaller axial extent than the support rings. It is advantageous that the support rings extend beyond the web-like intermediate ring in the axial direction so that the support rings thereby protect the intermediate ring against damage.

According to a further embodiment, stop buffers are provided that extend axially from at least one of the support rings. These stop buffers may be provided on both sides of the inner or outer intermediate ring, and extend radially towards the other support ring. In this embodiment, the stop buffers are axially displaced beyond the periphery of the axial extent of the web elements. The web elements and the stop buffers can be developed so as to pass integrally into each other and serve to limit extreme deflections of the inner support ring and outer support ring in the radial direction relative to each other. This refinement helps both to reduce the loads on the holding surfaces of the web elements as it helps avoid extreme deflections of the guided shaft.

The stop buffers can be formed by closed circumferential beads which project in the radial direction, or by nubs which project in radial direction and which are uniformly distributed over the circumference and which are arranged adjacent to each other at a circumferential distance. The extent of the end position damping of the two support rings in the radial direction with respect to each other is determined substantially by the geometry of the stop buffers and by the rubber-elastic material used.

With a view towards providing a long lasting and reliable setting of the position of the intermediate ring between the support rings, the intermediate ring can be stiffened in the region of at least one support ring by a metal insert. This insert may be provided with openings through which the elastic rubber material passes, the rubber material being developed continuously on the side of the openings facing away from the support bodies. This assures a reliable adhesive and form-locked connection of the intermediate ring between the support rings.

BRIEF DESCRIPTION OF THE DRAWINGS

These and other features, aspects, and advantages of the present invention will become better understood with regard to the following description, appended claims and drawings. The accompanying drawings show the individual components in diagrammatic form.

DETAILED DESCRIPTION

Figure 1:
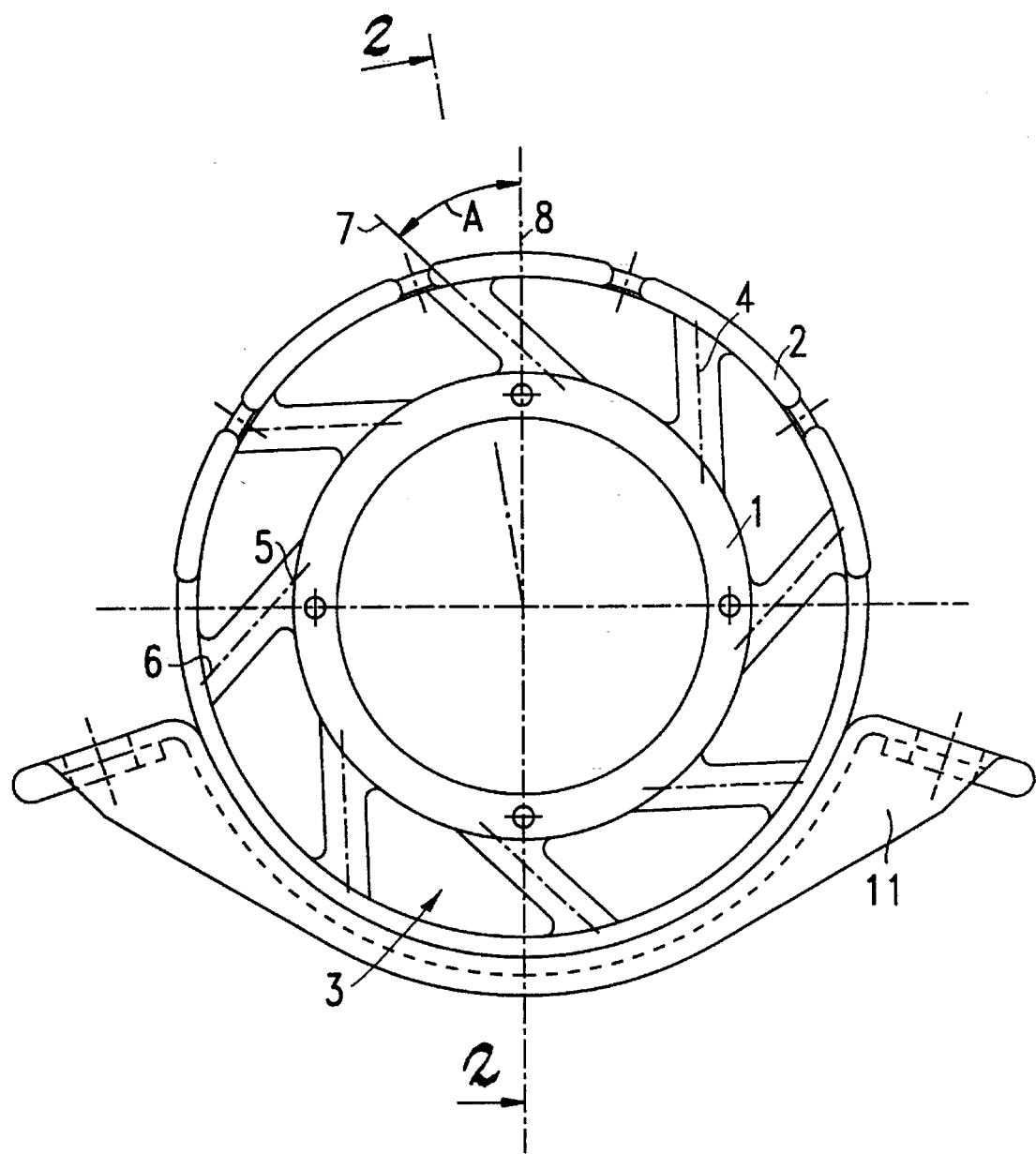
FIG. 1 is a front view of an embodiment of the bearing constructed according to the principles of the invention.
Figure 2:
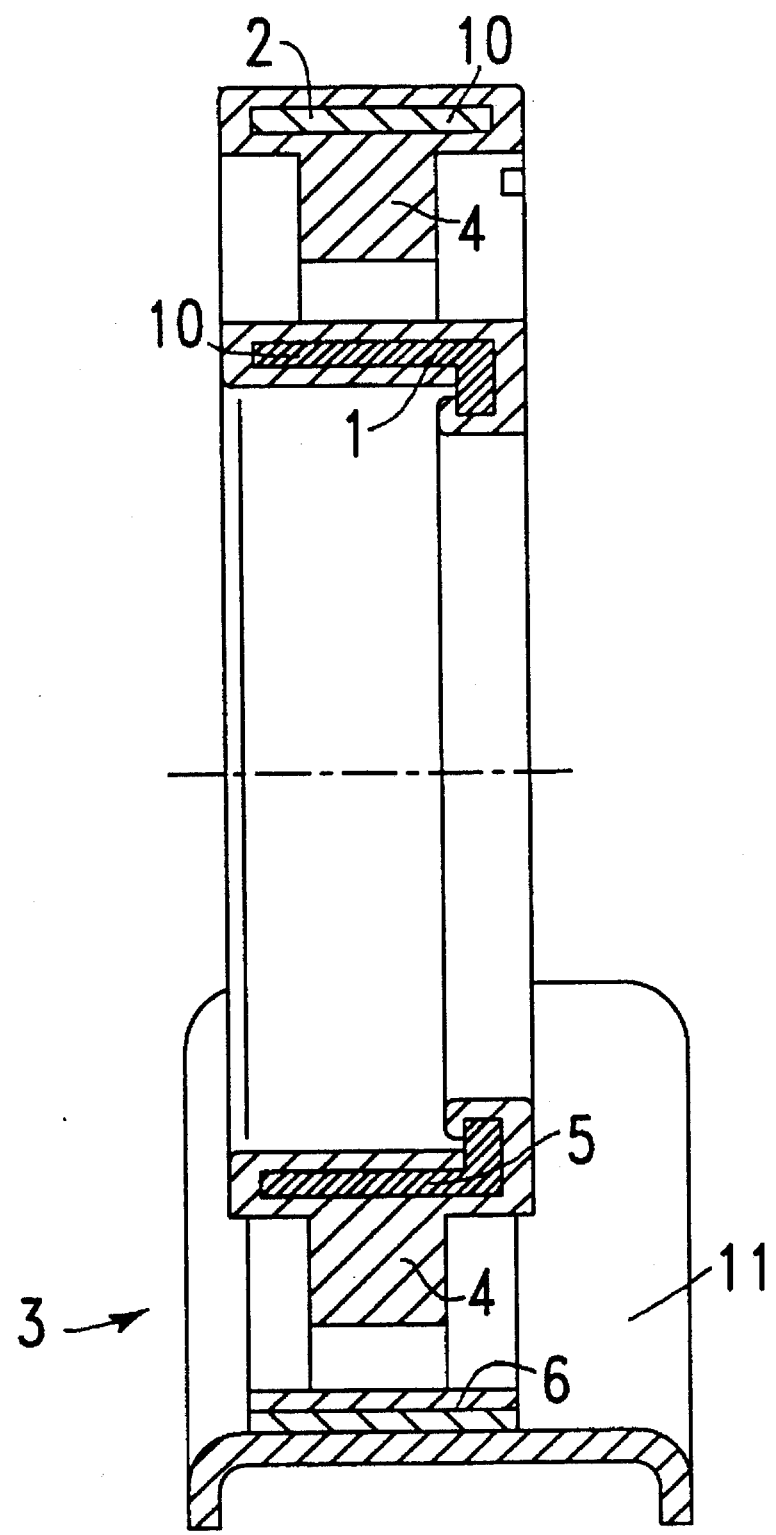
FIG. 2 shows the embodiment of FIG. 1 in a section taken along the line A—A.

FIGS. 1 and 2 show an embodiment of a bearing which is used for instance as a cardan shaft bearing in motor vehicles. The bearing comprises an inherently stable inner support ring 1 and an inherently stable outer support ring 2, which are generally made of a metallic material. These two rings are supported on each other in a radially elastic manner by an intermediate ring 3 that is made of a rubber-elastic material. In this embodiment, the intermediate ring 3 is formed of eight web elements 4 that are uniformly distributed over the circumference of the rings. Each web element is securely held to the inner and outer rings along inner and outer holding surfaces 5 and 6, respectively (e.g., by adhesive). The outer support ring 2 is firmly connected to a bearing bracket 11 which may be penetrated by screws for connection to the body of a motor vehicle. The inner holding surfaces 5 are arranged on the side of the web elements 4 facing the inner support ring 1, and the outer holding surfaces 6 are arranged on the side of the web elements 4 facing the outer support ring 2. These holding surfaces are positioned so that the linking portion connecting them is inclined in the circumferential direction between the two support rings 1, 2. The central region of the circumferential length of the inner holding surface 5 and the outer holding surface 6 is in each case so arranged with respect to each other that an imaginary line 7 which intersects the central region of the circumferential length of the holding surfaces 5 and 6 forms with an intersecting radial plane 8 an angle A which in this embodiment is about 45°. Different angles, for instance between 15° and 75°, may also be employed without unduly compromising the service life or working properties of the bearing. The web elements 4 are of increased size in the circumferential direction in the region of their inner and outer holding surfaces 5 and 6. This helps secure the component in position between the inner and the outer support rings 1 and 2.

As shown in FIG. 1, the portion of each of the web elements 4 that is between the inner and outer holding surfaces has substantially parallel opposed surfaces.

As illustrated in FIG. 2, both the inner support ring 1 and the outer support ring 2 are stiffened by metal inserts 10, which have openings which are traversed by the elastic rubber material, the rubber material being developed continuously on the side of the openings facing away from the web elements 4. In addition to an adhesive fixing in position the web elements 4 between the support rings 1 and 2, this development also achieves a form-locked connection so that the advantageous properties in use are retained during a very long service life.

Figure 3:
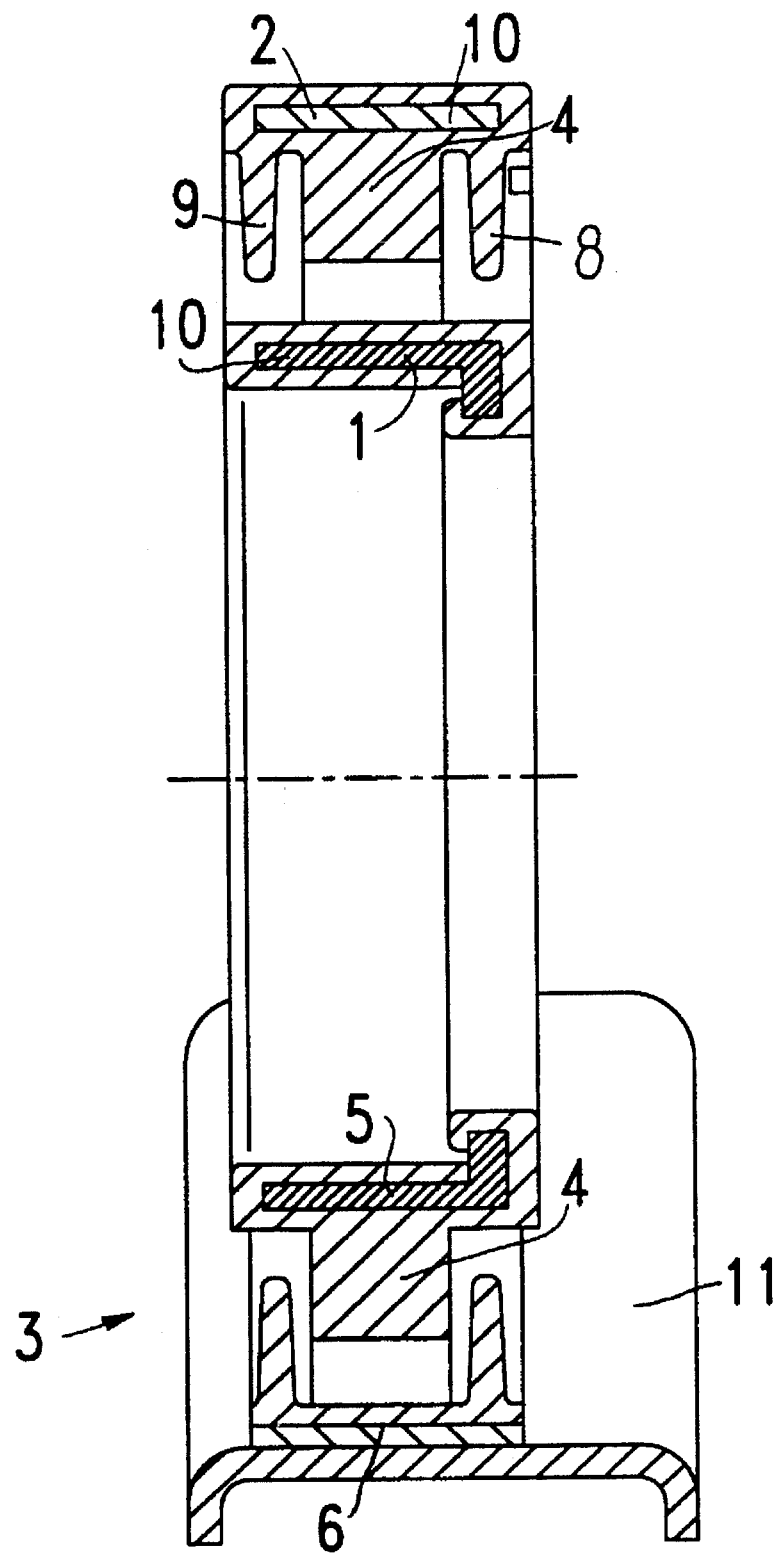
FIG. 3 shows an alternative embodiment, in which the bearing is provided with stop buffers for limiting extreme deflections of the two support rings with respect to each other.

FIG. 3 shows a bearing similar to that of FIGS. 1 and 2, in which stop buffers 8 and 9 are provided between the inner and the outer support rings 1, 2, said buffers being developed integral with the web elements 4. The stop buffers 8, 9 extend from the outer support ring 2 radially in the direction of the inner support ring 1 and can be brought into engagement with the opposing surface upon extreme deflections of the two support bodies 1, 2 with respect to each other, The manner of operation and the advantageous properties in use of this embodiment are otherwise the same as those of the embodiment illustrated in FIGS. 1 and 2.

What is claimed is:

1. A bearing, comprising:

an inner support ring;

an outer support ring surrounding the inner support ring at a radial distance; and an intermediate ring made of rubber-elastic material by which the inner and outer support rings are supported on each other in a radially elastic manner, the intermediate ring including at least three elongate web elements which are distributed over the circumference of the support rings and which are fastened to the support rings along holding surfaces along the inner support ring and the outer support ring, each of said web elements having axially extending side surfaces that are substantially parallel to one another when the bearing is in an unstressed state;

wherein the holding surface along the inner support ring and the holding surface along the outer support ring are connected by an intermediate linking portion of each of the web elements that lies along an imaginary line which intersects the central region of the circumferential extent of each holding surface, said imaginary line forming an angle with respect to a radial plane of 15°–75°.

2. The bearing according to claim 1, wherein the angle A is between 30° and 60°.

3. The bearing according to claim 1, wherein the web elements are distributed uniformly over the circumference of the support rings.

4. The bearing according to claims 1, wherein the web elements are of increased circumferential extent in the region of the holding surfaces.

5. The bearing according to claim 1, wherein the web elements include a strengthening reinforcement.

6. The bearing according to claims 1, wherein the web elements are of smaller axial extent than the support rings.

7. The bearing according to claim 6, wherein extending from at least one of the support rings there are provided at least two stop buffers which extend radially in the direction towards the other support ring and wherein the stop buffers are located at an axial extent that is greater than the axial extent of the web elements.

8. The bearing according to claim 7, wherein the web elements and the stop buffers are formed integrally so that they interpenetrate.

9. The bearing according to claims 7, wherein the stop buffers are formed as closed circumferential beads which project in the radial direction.

10. The bearing according to claim 7, wherein the stop buffers are formed by nubs which project in a radial direction and which are distributed uniformly over the circumference of the ring and which are arranged adjacent and spaced from each other along the circumference.

11. The bearing according to claim 1, wherein the intermediate ring is stiffened in the region of at least one support ring by a metal insert which has openings through which the elastic rubber material passes, said elastic rubber material being continuous on the side of the openings facing away from the web elements.

12. The bearing according to claim 3, wherein the intermediate ring is stiffened in the region of at least one support ring by a metal insert which has openings through which the elastic rubber material passes, said elastic rubber material being continuous on the side of the openings facing away from the web elements.

13. The bearing according to claim 4, wherein the intermediate ring is stiffened in the region of at least one support ring by a metal insert which has openings through which the elastic rubber material passes, said elastic rubber material being continuous on the side of the openings facing away from the web elements.

14. The bearing according to claim 7, wherein the intermediate ring is stiffened in the region of at least one support ring by a metal insert which has openings through which the elastic rubber material passes, said elastic rubber material being continuous on the side of the openings facing away from the web elements.

15. The bearing according to claim 9, wherein the intermediate ring is stiffened in the region of at least one support ring by a metal insert which has openings through which the elastic rubber material passes, said elastic rubber material being continuous on the side of the openings facing away from the web elements.

16. The bearing according to claim 10, wherein the intermediate ring is stiffened in the region of at least one support ring by a metal insert which has openings through which the elastic rubber material passes, said elastic rubber material being continuous on the side of the openings facing away from the web elements.

17. The bearing according to claim 1, wherein the web elements are adhesively bonded to the inner and outer support rings along the holding surfaces.

18. The bearing of claim 1, wherein the inner and outer support rings are made of metal.

* * * * *